Figure 1:
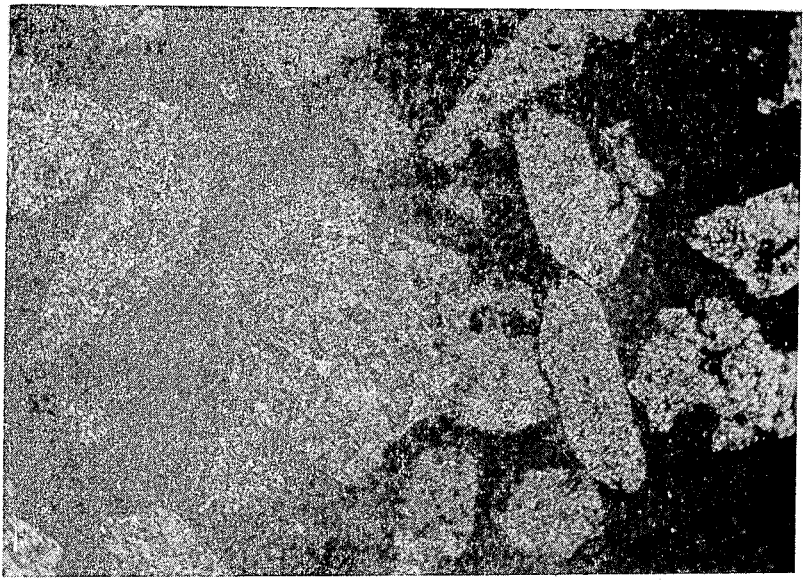

3,329,622
NOVEL PRODUCT AND PROCESS

William R. Harris, Akron, Ohio, and Ralph W. Miller, Bridgeville, Pa., assignors to Pittsburgh Plate Glass Company, Pittsburgh, Pa., a corporation of Pennsylvania
Filed Jan. 23, 1964, Ser. No. 339,754
15 Claims. (Cl. 252—192)

This invention relates to fortifying soda ash (sodium carbonate) with caustic soda (sodium hydroxide) to provide a high strength product with relatively high effective $Na_2O$ content. It relates more particularly to providing individual particles of product comprising sodium carbonate and sodium hydroxide. More specifically, this invention relates to a new product of individual particles comprising a core of sodium carbonate encased in a crust or shell of sodium hydroxide.

Both soda ash and caustic soda are important commercial alkalies. These two materials differ markedly in effective $Na_2O$ content; essentially pure sodium hydroxide has an effective $Na_2O$ content of about 77.5 percent by weight compared to about 58.5 percent by weight $Na_2O$ in essentially pure sodium carbonate. Heretofore, when an $Na_2O$ content between these limits has been desired, simple mechanical mixtures of appropriate quantities of soda ash and caustic soda have often been used.

Soda ash is more friable than caustic soda. This property is often undesirable, especially in bulk handling and feeding equipment. Caustic soda has a significantly higher bulk density and is significantly more hygroscopic than is soda ash. In the large scale chemical operations in which mechanical mixtures of soda ash and caustic soda are used, it is common to handle the raw materials in bulk, e.g., by means of conveyors and hopper feeds. Thus, a mechanical mixture is often subjected to a good deal of classifying motion before being introduced into the process. The materials are also subjected to comminution action in this fashion. Under these conditions, quality control, i.e., nearly constant $Na_2O$ content of the raw material introduced to a process, is difficult to maintain.

This invention provides individual particles with $Na_2O$ content greater than is provided by soda ash but less than is provided by caustic soda. The individual particles have substantially the same $Na_2O$ content and possess substantially equivalent physical properties. Classification has little effect on the $Na_2O$ content of a sample taken at random from a stock of the material. Thus, this material provides substantially uniform $Na_2O$ per pound of charge to a process even when it has been handled in bulk and fed through hoppers or similar equipment. Pursuant to this invention, particulate product is provided with bulk density typically ranging from about 63 to about 66, rarely more than about 70 or less than about 59 pounds per cubic foot. The effective $Na_2O$ content of the new product is typically about 58.5 to about 61, rarely in excess of about 63 percent, basis the weight of the product. The individual particles have significantly higher particle strength, i.e., are less friable than particles of soda ash.

According to this invention, particles of soda ash are fortified with sodium hydroxide. The soda ash particles are moistened with an aqueous solution of caustic soda. The resulting mixture is then dried, preferably in a fluidized bed operating with a fluidizing gas inert to the materials in the mixture.

In discussing fluidized bed in the specification and claims, it is to be understood that the term "fluidized bed" is employed in the broad sense. In conducting fluid bed processes, gases are passed upwardly at varying velocities through a bed of finely divided, solid particles. When a gas is passed through a bed of solid particulate material several different conditions may be established depending upon the gas velocities employed, the size of the particles used, and other similar considerations. Thus, if the gas velocity is low, a bed of solids remains static. As the gas velocity is increased in the bed, however, some of the particles become dynamically suspended in the upwardly rising gas stream. As a result, the bed height expands and a bed which is termed a "dynamic bed" is established. If the gas velocity is still further increased, the particles all become suspended and the bed expands even further. Ultimately, the bed may assume a highly turbulent condition which in many ways resembles a boiling liquid. The present process may be applied to either dynamic beds or beds resembling the boiling liquid type and both beds are embraced by the term "fluidized bed" employed herein. The exact conditions requisite to establishing either of the bed conditions depends upon factors such as particle size, the bed components, gas velocities, density of the bed particles and other similar considerations. Wilhelm and Kwauk, Chemical Engineering Process, volume 44, page 201 (1948), equate the various factors necessary for fluidizing a bed and by following the principles therein discussed, one skilled in the art can readily establish the desired bed conditions for the gases and bed materials contemplated herein.

The fluidized gas is maintained at a temperature and velocity sufficient to cause water to evaporate from the charge mixture in the bed. Bed temperatures below 130° C. are found to require an inordinate amount of time to produce a suitable product. Bed temperatures of about 175 to about 200° C. have been found most economical in practice. Rarely are temperatures in excess of 250° C. required to produce a satisfactory product at an acceptable rate. It is, of course, possible to remove moisture from the charge mixture at temperatures below the boiling point of water. The bed temperature should not exceed the melting point of the bed materials or the components of the charge mixture.

Suitable fluidizing gases include without limitation air and nitrogen. Air is usually employed because of its ready availability. As previously explained herein, temperatures and velocities of the fluidizing gas are dependent on many variables. It has been found that when the bed material comprises dried product particles with screen analysis comparable to typical medium grade soda ash, inlet gas temperatures of 150 to 350° C. are operable when introduced at velocities equivalent to 10 to 70 feet per minute across a free area (i.e., an area free from obstructions such as bed materials). It should be understood that other temperatures and velocities are also operable.

Product is recovered from the fluid bed in the form of individual particles each of which comprises a core of sodium carbonate encased in a crust of sodium hydroxide. Typically, the core consists of a single particle of soda ash. Sometimes a plurality of usually 2 to 4, rarely more than 12, of soda ash particles are included in a single product particle core. It is believed possible that the crust may sometimes contain some sodium carbonate in combination with sodium hydroxide. Under the microscope, the crust has the appearance of sodium hydroxide.

Thin cross sections of product manufactured in accordance with this invention were imbedded in resin. The mounted samples were polished and examined under polarized monochromatic light. Under this kind of light, each specific chemical compound has a unique angle of light extinction. By this method of identification, the outer crust of the product was seen to consist essentially of sodium hydroxide.

Commercial soda ash is produced in two major grades, light and dense. These grades differ as to physical characteristics such as bulk density, size distribution and shape of particle. The light ash is typically more friable than the dense ash. The commercial products are primarily anhydrous and of high purity, usually having a minimum $Na_2O$ equivalent of about 58 percent.

Light soda ash is a fine white crystalline product with a bulk density between about 35 pounds per cubic foot when loosely packed to about 43 pounds per cubic foot when it is vibrated extensively. Dense soda ash is typically produced by passing light soda ash, moistened with water, through densifying and drying equipment. Typically, sufficient water is added to the light ash to insure that it will pass through the monohydrate phase during the densification step. The resulting dense ash is essentially anhydrous and is granular with substantially higher bulk density than the light soda ash. Dense ash is typically graded according to screen sizes. Typical grades are:

GRADES

| Screen mesh size | Fine | Medium | Coarse | Very coarse |
|---|---|---|---|---|
| On 28 | | 2% | 20% | 60% | 96% |
| Through 28 | | | | | 4% |
| On 48 | | 46% | 37% | 30% | |
| On 80 | | 35% | 22% | 7% | |
| Through 80 | | 17% | 13% | 3% | |

Both dense and light soda ashes can be processed in accordance with this invention. When light ash is used, the process of this invention is often substituted for the densifying step typically employed in the manufacture of dense ash. Thus, aqueous sodium hydroxide solution is added to the light ash and the moistened ash is fed through a fluid bed in the same fashion as when dense ash is used as a starting material. In this way, the normal densifying and drying steps are included in the caustic fortification step in the fluid bed.

The bulk density of the product produced in accordance with this invention is typically in excess of the average bulk density of dense soda ash. Usually the bulk density of the product obtained with light ash in the charge is somewhat, e.g., 5 to 15 percent, basis the dense ash product, less than would be expected were dense ash the starting material. The quality of the product produced with dense ash as a starting material has been found to be markedly superior in most instances. Dense ash feed typically produces a product with better crystal structure and larger crystals. Superior crystal structure results in increased strength properties. Aggregates of particles, i.e., lumps, are less likely to occur in the bed when dense ash is used in the charge mixture.

Figure 2:

FIGURE 1 is a photomicrograph of a thin section of a particle of typical dense soda ash. FIGURE 2 shows a thin section of the product obtained by utilizing the dense soda ash pictured in FIGURE 1 in the practice of this invention. Comparing FIGURE 1 with FIGURE 2, it is readily seen that the particles of FIGURE 2 each comprise a core of soda ash with a coating or shell of dissimilar material.

The invention will be more readily understood with reference to the following examples.

*Example 1*

500 gram samples were taken from a stock of typical medium grade dense soda ash. Three of the 500 gram batches of dense soda ash were mixed intimately with 150 grams of aqueous solution containing 50 percent by weight sodium hydroxide by tumbling in a glass jar on a Kendall Tumbler for one hour.

The caustic moistened ash was pasty in texture. The mixtures were charged by means of a vibratory feeder to a fluidized bed in a glass fluid bed reactor 2⅜ inches in diameter. The reactor was jacketed with an asbestos-wound glass sleeve. Suction applied to this outer jacket pulled hot air from the reactor down around its outer walls, thereby maintaining the wall temperature of the reactor at approximately the same temperature as the fluidizing gas stream.

Heat to the fluid bed dryer was obtained by passing a metered air stream at rates equivalent to 20 to 25 feet per minute across a free area through a chip-filled ceramic tube. The tube was heated by an electric furnace. The air line from the furnace to the reactor was lagged with heating tape to avoid undue heat losses.

The starting bed in all runs was dense ash taken from the aforementioned stock and preheated in an electric oven to about 150° C.

Dry material discharge from the reactor bed was either through a side arm overflow tube or through a suction tube periodically inserted into the fluidized bed to draw solids from the bed. The bed depth was maintained between 4 to 5 inches. A two-blade, pitched vane, paddle-type stirrer was installed in the reactor with the blade about ¼ inch above the bed plate and rotated about 325 r.p.m. This stirring improved bed fluidity.

Three runs were made in accordance with Table I. The material from the runs were of fairly uniform size. There were no large aggregated particles in the bed material and there was no visible sign of packing in the bottom of the reactor. There was negligible blow off of fines from the fluidized bed during the runs. Table II gives the analytical test results obtained on the dry products of each of the runs. The table includes corresponding data for the stock soda ash from which the gram batches used in the runs were taken.

TABLE I

| Run | Weight of material in grams to initially charge the bed | Length of run in minutes | Temperature of gas entering the bed | Average bed temperature, ° C. | Approximate feed rate in grams per minute | Air flow rate in liters per minute (STP) |
|---|---|---|---|---|---|---|
| 1 | 332 | 132 | 210 | 195 | 3.5 | 17.9 |
| 2 | 450 | 195 | 270 | 185 | 2.2 | 16.6 |
| 3 | 400 | 465 | | 181 | 3.2 | 15.5 |

TABLE II

| Run | Percent weight $Na_2O$ | Percent by weight $H_2O$ loss at 150² C. for 24 hours | Bulk density in pounds per cubic foot | Percent by weight on screens after friability tests | | |
|---|---|---|---|---|---|---|
| | | | | 100 mesh | 200 mesh | Pan |
| 1 | 59.9 | 0.43 | 64 | | | |
| 2 | 59.6 | 0.05 | 66 | 92.0 | 4.0 | 4.0 |
| 3 | 60.1 | 0.01 | 63 | 91.0 | 4.8 | 4.2 |
| Dense soda ash | 58.3 | 0.1 | 59 | 80.2 | 10.3 | 9.5 |

The standard friability test referred to in this specification consists of charging 150 gram samples of material (minus 50, plus 100 mesh) into an air pressurized (20 p.s.i.g.) sand blast gun with 5/32 inch diameter inside orifice and a 1/4 inch diameter discharge nozzle. The material is then air-blasted against a solid surface. All residues from the blast are screened to ascertain the weights of material on 100 mesh and 200 mesh screens together with all residues passing through a 200 mesh screen into the sieve pan.

*Example 2*

The fluid bed dryer of Example 1 was used. Except as otherwise indicated herein, this example was conducted the same as Example 1. Feed material was prepared by mixing batches of 300 grams of light soda ash with 89.3 grams of aqueous solution of sodium hydroxide containing 50 percent by weight sodium hydroxide and 100.7 grams of distilled water. The mixture was allowed to age for several days in an oven at 90° C. Some of the moisture was lost from the mixture of run 1 because of a faulty lead seal. Therefore, the estimated water content of the feed material for run 1 was about 30 percent while that for run 2 was about 35 percent.

The water content was chosen to insure that the sodium carbonate would be in the monohydrate phase when charged to the fluidized bed. More water must be present to keep sodium carbonate in the monohydrate phase when sodium hydroxide is present in the system then in the two component system. Thus, the mixture charged to the bed in this example contained light ash in about the same form as it normally exists during a typical densification operation.

A microscopic examination of the feed material showed that the mixture consisted of monohydrated soda ash crystals of a regular shape and rather indistinct crystal cores. The bed charge for run 1 was 200 grams of dense soda ash preheated to 150° C. The bed charge for run 2 was spent bed material recovered from run 1 and preheated to 150° C.

Experimental data for each of the runs is shown in Table III.

about 61 weight percent $Na_2O$. The $Na_2O$ content is varied from about 58.5 to about 65 percent by substituting caustic liquors (i.e., containing from about 35 to about 80 percent by weight, respectively, sodium hydroxide) in intimate mixture with the soda ash. Caustic liquor containing more than 50 percent caustic soda must ordinarily be heated to above room temperature to keep it fluid. As an example, feed material containing 75 percent caustic liquor must ordinarily be prepared and fed to the bed at temperatures above 140° F. The $Na_2O$ content of the product is also increased up to as high as 65 percent or more by intimately mixing caustic fortified product from a first pass through the fluid bed with additional caustic liquor and passing this second fortified mixture through the fluid bed.

The size of product particles produced in accordance with this invention is determined by the size (configuration) of the soda ash particles which are used. Typically, they are only slightly larger than the initial dense soda ash particles introduced to the charge mixture. If light ash is used as a starting material, the product particles are only slightly larger than the dense ash particles that would result from a typical commercial densification step. The weight percent of sodium hydroxide in the charge mixture is typically between about 10 and about 14, rarely in excess of about 16. The remainder of the mixture, exclusive of water, is essentially sodium carbonate. Thus, the average diameter of the product particle rarely exceeds the diameter of the sodium carbonate core by more than 5 percent. It is seen from FIGURE 2 that the thickness of the sodium hydroxide shell varies around the perimeter of the soda ash core. Pits on the surface of the soda ash tend to fill with caustic soda. A typical product particle with a core 0.4 millimeter in diameter, for example, usually is coated with a shell with an average thickness, ignoring filled pits on the core's surface, between 2 to 10 microns.

Of course, the quality of material, i.e., the amount of impurities obtained in the final product will depend upon the materials utilized in manufacturing the fortified soda ash particles. Thus, it should be understood that impuri-

TABLE III

| Run | Weight of material in grams to initially charge the bed | Length of run in minutes | Temperature of gas entering the bed | Average bed temperature, ° C. | Approximate feed rate in grams per minute | Air flow rate in liters per minute (STP) |
|---|---|---|---|---|---|---|
| 1 | 200 | 140 | 270 | 185 | 1.6 | 16.6 |
| 2 | 200 | 279 | 270 | 184 | 1.8 | 16.6 |

The results of the runs are shown in Table IV.

ties will be present in the product of this invention to

TABLE IV

| Run | Percent weight $Na_2O$ | Percent by weight $H_2O$ loss at 150° C. for 24 hours | Bulk density in pounds per cubic foot | Percent by weight on screens after friability tests | | |
|---|---|---|---|---|---|---|
| | | | | 100 mesh | 200 mesh | Pan |
| 1 | 58.8 | 0.01 | | | | |
| 2 | 59.4 | 0.01 | 61.3 | 57.2 | 25.9 | 16.9 |
| Dense ash | 58.3 | 0.1 | 59 | 81.5 | 9.5 | 9.0 |
| Light ash | 58.3 | 0.1 | 35 | 47.1 | 30.6 | 22.3 |

The properties of caustic-fortified dense ash product obtained in accordance with this invention can be varied by varying the conditions of operation. Thus, the product may be made more alkaline by increasing the relative amount of sodium hydroxide in the particle. Typical particles produced with 50 percent caustic liquor with one pass through the fluid bed contain between about 59 to about the same extent that they are present in the starting materials, i.e., the soda ash, caustic soda, and water.

The fluid bed may be operated in any convenient manner. Thus, the charge mixture may be introduced to the top of the bed or it may be mixed into the bed or introduced under the bed. In the preferred embodiment, the bed comprises dried particles of fortified product. Other suitable bed materials include without limitation sand, silica, clay, glass beads, soda ash and other inert materials. Of course, unless the bed is kept homogeneous, a physical separation of product from the bed material is necessary.

This invention has been described with reference to sodium hydroxide and sodium carbonate. It should be understood that equivalent materials can be used without departing from the spirit and scope of this invention. For example, a different alkali metal hydroxide may be substituted for all or part of the caustic soda. Similarly any alkali metal carbonate may be substituted for all or part of the soda ash. Thus, this invention includes within its scope product particles with a core consisting essentially of any combination of the carbonates of sodium, potassium, and lithium coated with a crust consisting essentially of any combination of the hydroxides of sodium, potassium and lithium.

Although this invention has been described with reference to certain preferred embodiments, it is not intended that the claims be limited to those specific embodiments except insofar as they are recited in the claims.

We claim:
1. A particle consisting essentially of a core of alkali metal carbonate encased in a shell of alkali metal hydroxide and having an effective alkali metal oxide content above that of the alkali metal carbonate and below that of the alkali metal hydroxide.

2. The particle of claim 1 wherein the average diameter of the particle is up to 5 percent greater than the average diameter of the carbonate core.

3. A particle consisting essentially of a core of sodium carbonate encased in a shell of sodium hydroxide and having an effective sodium oxide content above that of the sodium carbonate and below that of the sodium hydroxide.

4. The particle of claim 3 wherein the effective $Na_2O$ content of the particle is up to about 65 percent by weight.

5. The particle of claim 4 wherein the effective $Na_2O$ content of the particle is between about 58.5 and about 63 percent by weight.

6. The particle of claim 5 wherein the effective $Na_2O$ content is between about 59 and about 61 percent by weight.

7. The particle of claim 6 with a bulk density between about 59 and about 70 pounds per cubic foot.

8. The particle of claim 7 with a bulk density between about 63 and about 66 pounds per cubic foot.

9. A particle consisting essentially of sodium hydroxide and sodium carbonate which includes a core consisting essentially of sodium carbonate and which is characterized by having bulk density in excess of about 59 pounds per cubic foot and $Na_2O$ content greater than that of sodium carbonate.

10. A particle manufactured from about 84 to about 90 percent by weight sodium carbonate and essentially all of the remaining weight percent sodium hydroxide which includes a core consisting essentially of sodium carbonate and which is characterized by having an effective $Na_2O$ content above about 59 percent.

11. A method of making individual particles of a product with higher effective alkali metal oxide content and lower friability than an alkali metal carbonate which comprises intimately mixing said alkali metal carbonate particles with an aqueous solution of an alkali metal hydroxide, feeding the mixture to a fluidized bed operating at a temperature sufficient to evaporate the water from the mixture, retaining the mixture in the fluidized bed sufficiently long to produce dry individual particles and recovering the particles from the fluidized bed.

12. A method of manufacturing individual particles of a product with higher effective $Na_2O$ content and lower friability than soda ash which comprises mixing sodium carbonate particles with an aqueous solution of sodium hydroxide and feeding the mixture to a fluidized bed operating at a bed temperature above 130° C. to evaporate the water from the mixture thereby to obtain individual particles of product consisting essentially of a core of sodium carbonate encased in a shell of sodium hydroxide.

13. The method of claim 12 wherein the soda ash is dense soda ash with a bulk density of about 56 to about 58 pounds per cubic foot and the product has bulk density between about 59 to about 70 pounds per cubic foot.

14. The method of manufacture of particles from dense soda ash and sodium hydroxide which particles are less friable and have higher effective $Na_2O$ content than the dense soda ash which comprises mixing by weight about 84 to about 90 percent particulate dense soda ash with about 16 to about 10 percent sodium hydroxide, said sodium hydroxide being in aqueous solution and feeding said mixture to a fluidized bed operating in air with a bed temperature between about 130 and about 200° C. to evaporate the water from the mixture thereby to obtain individual particles of products consisting essentially of a core of soda ash encased in a shell of sodium hydroxide.

15. The method of claim 14 wherein the sodium hydroxide is in the form of about 35 to about 50 percent by weight aqueous solution.

References Cited
UNITED STATES PATENTS 2,586,818   8/1947   Harms _____ 117—100 X
3,231,413   11/1962  Berquin _____ 117—100

LEON D. ROSDOL, *Primary Examiner.*

SAMUEL H. BLECH, *Examiner.*

S. D. SCHWARTZ, *Assistant Examiner.*